United States Patent
Duncan

[15] 3,640,496
[45] Feb. 8, 1972

[54] PLUG OR STOPPER FOR THE OPEN ENDS OF TUBULAR METAL APPLIANCES

[72] Inventor: Leslie C. V. Duncan, Emsworth, England
[73] Assignee: Southbourne Rubber Company Limited, Emsworth, England
[22] Filed: June 18, 1969
[21] Appl. No.: 834,939

[30] Foreign Application Priority Data

June 21, 1968  Great Britain...................56,995/68
Dec. 2, 1968   Great Britain....................7,117/69

[52] U.S. Cl..............................248/188.9, 16/42
[51] Int. Cl. ...................................A47b 91/06
[58] Field of Search............248/188.9, 346.1; 16/42, 42 T

[56] References Cited

UNITED STATES PATENTS

| 450,691 | 4/1891 | Abbott | 248/188.9 |
| 870,770 | 11/1907 | Fuller | 248/188.9 |
| 1,783,873 | 12/1930 | Duncan | 248/188.9 |
| 1,937,438 | 11/1933 | Schaeht | 248/188.9 |
| 2,127,035 | 8/1938 | Kitlin | 248/188.9 |
| 2,244,976 | 6/1941 | Tinnerman | 85/80 |
| 2,403,810 | 7/1946 | Lord | 85/83 |
| 2,420,826 | 5/1947 | Irrgang | 16/108 |
| 2,567,865 | 9/1951 | Becker | 16/42 T |
| 3,141,489 | 7/1964 | Rapata | 85/80 |
| 3,389,421 | 6/1968 | Wheeler | 16/42 |

FOREIGN PATENTS OR APPLICATIONS

| 9,734 | 9/1911 | Great Britain | 16/42 T |
| 986,214 | 3/1965 | Great Britain | 248/188.9 |
| 1,077,814 | 5/1954 | France | 248/188.9 |
| 1,336,720 | 7/1963 | France | 16/42 |

Primary Examiner—Marion Parsons, Jr.
Attorney—Woodhams, Blanchard & Flynn

[57] ABSTRACT

A plug for insertion into an end of a metal tubular appliance, such as a leg of a chair or other article of furniture to form a protective cushion. The plug is formed from rubber or other incompressible material and has a shank portion, provided with axial grooves, which in use is embraced by a split ferrule. Upon being driven into the end of the appliance the ferrule contracts to tightly grip the shank portion and the material of the shank portion is displaced into the grooves.

2 Claims, 10 Drawing Figures

PATENTED FEB 8 1972 3,640,496

INVENTOR
LESLIE C. V. DUNCAN

BY Woodhams, Blanchard & Flynn
ATTORNEYS

PATENTED FEB 8 1972  3,640,496

INVENTOR
LESLIE C. V. DUNCAN

BY Woodhams, Blanchard & Flynn
ATTORNEYS

PLUG OR STOPPER FOR THE OPEN ENDS OF TUBULAR METAL APPLIANCES

The present invention relates to a plug or stopper for the open ends of tubular metal appliances such as the legs of chairs or other articles of furniture.

Thus the invention seeks to provide a protective cushion to prevent damage to a floor or other surface on which the appliance stands or over which it may be moved. The invention also seeks to reduce noise during a sliding movement of the appliance. The invention furthermore seeks to provide a plug of a simple, durable construction which can be readily and securely fitted to the appliance.

According to the present invention a plug for insertion into an open end of a tubular metal appliance comprises a head portion to cover the end of the appliance and a substantially cylindrical shank portion integral with the head portion for location within the interior of the appliance, the shank portion tapering from the head portion to its free end and being formed with a plurality of axial flutings or grooves.

Preferably the shank portion is contained within a cylindrical metal or plastics ferrule, the ferrule being split axially to enable it to contract when driven into the end of the tubular appliance. Preferably the plug is formed from natural or a synthetic rubber and upon a contraction of the ferrule the rubber is displaced into the axial flutings or grooves. The ferrule may be formed with a lip or flange at the end thereof abutting the head portion of the plug or alternatively the head portion may be formed with a metal washer insert encircling the shank portion to cooperate with the ferrule.

In order to locate the plug correctly in position in an end of a tubular appliance of noncircular cross section so that the head portion is correctly orientated with respect to the end of the appliance, a sector of the shank portion between two adjacent flutings extends radially outwardly along its whole length beyond the locus of a circle circumscribing the remainder of the shank portion. Preferably the sector is substantially normal to the head portion along the axial length thereof and does not taper towards its free end.

Alternatively, the ferrule may be provided with an axial lug or rib on its outer surface for the correct orientation of the plug.

Thus in the case of a hollow metal chair leg of square cross section, the plug will be formed with a square head to cover the ends of the leg. The outwardly extending sector on the plug or the protruding lug on the ferrule will be positioned such that the plug can only be inserted into the leg when the head portion is correctly oriented with respect to the leg.

The invention will be described further, by way of example, with reference to the accompanying drawings, in which.

Figure 1:
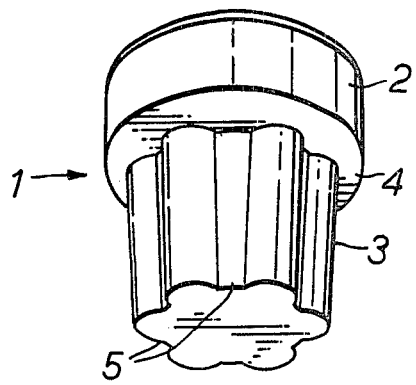
FIG. 1 is a perspective view from below of a first embodiment of a plug for use with a tubular metal appliance of circular cross section.
Figure 2:
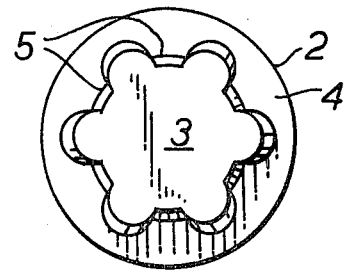
FIG. 2 is an underneath plan view of the plug shown in FIG. 1.

With reference to FIGS. 1 and 2, a plug 1 which is formed from rubber, natural rubber, plastics or other material having the same characteristics as rubber is molded to a generally cylindrical form and comprises a head portion 2 and a tapered shank portion 3. The shank portion 3 tapers from the head portion to its free end and a shoulder 4 is formed at the junction of the shank portion to the head portion.

The shank portion is formed with a plurality of circumferentially spaced axial flutings or grooves 5 extending the length thereof.

Figure 3:
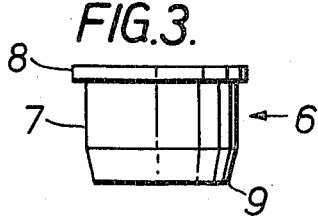
FIG. 3 is a side elevation of a first embodiment of a metal or plastics ferrule.
Figure 4:
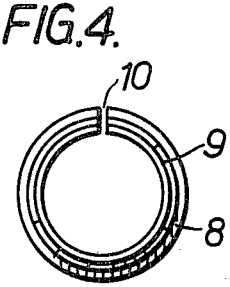
FIG. 4 is an underneath plan view of the ferrule.

FIGS. 3 and 4 illustrate one form of ferrule for use with the plug. The ferrule 6 may be of a metal or a plastic material and has a body portion 7 of substantially constant diameter terminating at one end in a laterally extending flange 8 and at its other end in an inwardly tapering portion 9. The ferrule is fitted on to the shank portion of the plug prior to the introduction of the plug into an open end of a tubular metal appliance, such as a chair leg, with the flange 8 abutting against the shoulder 4 on the plug. The ferrule is formed with a longitudinal slot 10 to enable the ferrule to contract and tightly grip the plug when the assembly is driven into the end of the metal appliance.

Figure 5:
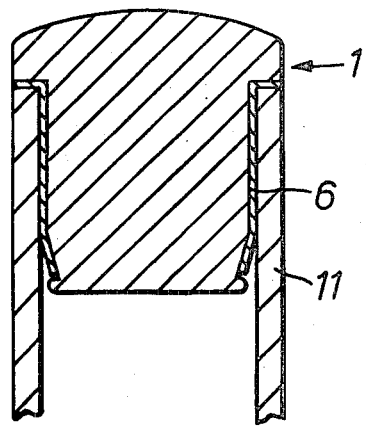
FIG. 5 is a sectional elevation of the plug and ferrule fitted in the end of a tubular metal chair leg.

FIG. 5 shows the assembly of plug and ferrule when fitted to the open end of a chair leg 11. Preferably the free end of the fluted shank portion 3 of the plug extends beyond the adjacent end of the ferrule so that under pressure the material of the plug will overlap the end of the ferrule and thus act to prevent the plug from being readily withdrawn from the leg.

Figure 6:
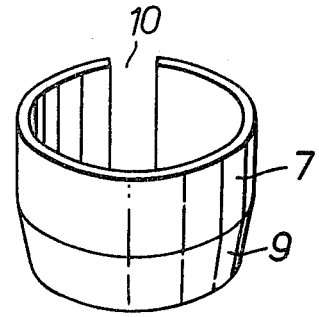
FIG. 6 is a perspective view from above of a second embodiment of a metal or plastics ferrule.
Figure 7:
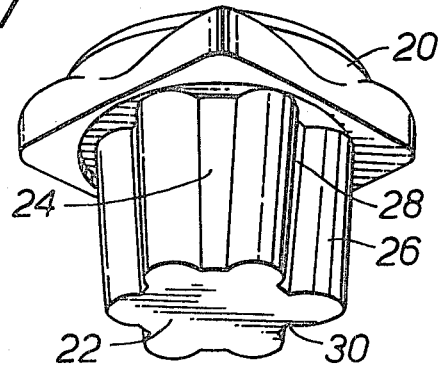
FIG. 7 is a perspective view, from below of a second embodiment of a plug for use with a tubular metal appliance of square cross section.
Figure 8:
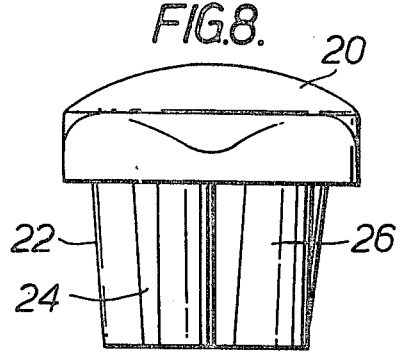
FIG. 8 is an elevation of the plug illustrated in FIG. 7.

For an alternative form of ferrule reference is made to FIG. 6. The ferrule in FIG. 6 is identical to that described with reference to FIGS. 3 and 4 with the exception that it is not provided with a flange at one end thereof. In using a ferrule as shown in FIG. 6 the plug is provided with a metal washer insert in the shoulder 4.

The material of the plug is uncompressible and when driven into the end of a metal appliance the protruding axially extending regions between the grooves on the shank portion of the plug spread into the grooves thus increasing the frictional engagement. It will be realized that there is ample displacement of the material of the plug and thus one assembly is suitable for varying inside diameters of tube which is controlled by gauge thickness. Thus a satisfactory fit is obtained in relation to several different thickness gauge of materials.

The flutes or grooves in the plug may be of any section such as semicircular or square to ensure that, when the plug is inserted in the ferrule and the assembly is then driven into the end of the tubular metal appliance, there is ample space for displacement of the material of the plug to increase the frictional contact.

By fitting the ferrule on the plug prior to insertion in the open end of the tubular appliance to prevent damage to the stopper or plug. Normally when a stopper or plug is driven into the open end of a tube it causes damage by tearing or scuffing which results in a bad fit. The combination of stopper or plug and a ferrule precludes this fault, as the fit is obtained by compression, which takes place even though the device is suitable for use in several gauges of material.

With reference to FIGS. 7 to 10, a plug which is formed from rubber, natural rubber or other material having the same physical characteristics as rubber, comprises a head portion 20 and a shank portion 22. In the illustrated embodiment when viewed in plan and is dimensioned so as to cover the ends of a tubular chair leg of square cross section when the shank portion is inserted into the leg. The shank portion 22 is substantially cylindrical and tapers from the head portion to its free end.

The shank portion is formed with a plurality of axial flutings or grooves 24. A sector 26 of the shank portion between two adjacent flutings 28 and 30 extends radially outwardly along its whole length beyond the locus of a circle circumscribing the remainder of the shank portion. While the sector 26 may be tapered to conform with the tapered shank portion, preferably the sector 26 extends substantially at right angles to the head portion, in contrast to the remainder of the shank portion which is tapered. This ensures a more positive location of the plug within the end of the chair leg.

The shank portion is located within a metal or plastics ferrule 32 prior to insertion into the chair leg. Such a ferrule is described in relation to FIGS. 3 and 4.

Figure 10:
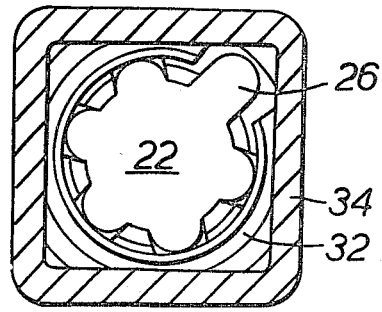
FIG. 10 shows the positioning of the plug and ferrule within a tubular metal appliance of square cross section.
Figure 9:
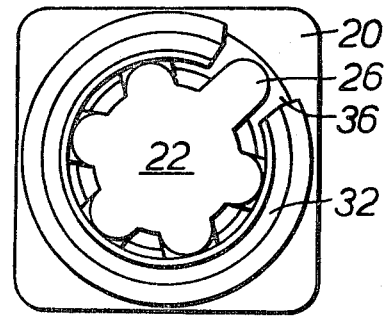
FIG. 9 is an end view of the plug of FIG. 7 with the shank portion contained within a ferrule as shown in FIG. 3.

As shown in FIG. 10, the plug is correctly orientated for insertion into the end of the chair leg when the outwardly extending sector of the shank portion is directed towards a corner of the leg 34. The ferrule is so arranged on the shank portion that the extending sector protrudes through the axial slit 36 in the ferrule.

The ferrule may be provided with V-shaped notches or cuts in the lower edge thereof.

As an alternative to providing the plug with an outwardly extending sector 26 the ferrule may be provided with a locating or orientating device, such as a lug or rib. In such a case the ferrule would be arranged on the shank portion with the lug or rib directed towards a corner of the head portion and hence towards a corner of the leg.

While the embodiment in FIGS. 7 to 10 has been described with reference to a plug for use with a leg of square section it will be appreciated that by suitable changes in the shapes of the head and shank portions the plug is applicable for use with any cross-sectional configuration. Likewise the invention is not restricted solely for use with chair legs, but is applicable for insertion into the open ends of other tubular metal appliances.

I claim:

1. A plug assembly for insertion into the open end of a tubular metal member, said plug assembly comprising a plug member constructed of a resilient rubberlike material and having a head portion adapted to engage the end of the tubular member and a substantially cylindrical shank portion integral with the head portion for location within the interior of the tubular member, the shank portion tapering from the head portion toward its free end and being formed with a plurality of circumferentially spaced, axially extending grooves, said grooves defining a plurality of axially extending deformable ribs, one of said axially extending ribs along substantially its whole length extending radially outwardly a substantial distance beyond the locus of a circle circumscribing the remainder of the shank portion, and a cylindrical ferrule embracing said shank portion, said ferrule being split axially to enable it to contract when driven into the open end of the tubular member.

2. A plug assembly according to claim 1, in which said one rib is substantially normal to said head portion along the complete axial length thereof.

* * * * *